(12) United States Patent
Gross et al.

(10) Patent No.: US 11,890,997 B2
(45) Date of Patent: Feb. 6, 2024

(54) ANTIMICROBIAL METALLIC TOUCH SURFACES AND METHODS FOR MAKING THE SAME

(71) Applicant: GM GLOBAL TECHNOLOGY OPERATIONS LLC, Detroit, MI (US)

(72) Inventors: Adam F. Gross, Santa Monica, CA (US); Janet C. Robincheck, Sterling Heights, MI (US); William Schumacher, South Lyon, MI (US); Nancy L. Johnson, Northville, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 346 days.

(21) Appl. No.: 17/208,599

(22) Filed: Mar. 22, 2021

(65) Prior Publication Data

US 2022/0295798 A1    Sep. 22, 2022

(51) Int. Cl.
*B60R 13/02*      (2006.01)
*A01N 59/20*      (2006.01)
*A01N 25/34*      (2006.01)

(52) U.S. Cl.
CPC .............. *B60R 13/02* (2013.01); *A01N 25/34* (2013.01); *A01N 59/20* (2013.01);
(Continued)

(58) Field of Classification Search
CPC ........ A01N 59/20; A01N 25/34; B60R 13/02; B60R 13/01; B60R 13/08; B60R 13/0892;
(Continued)

(56) References Cited

U.S. PATENT DOCUMENTS 4,806,400 A * 2/1989 Sancaktar .......... B29C 66/1226
                                                      428/35.9
9,694,739 B2    7/2017 Salter et al.
(Continued)

FOREIGN PATENT DOCUMENTS

CN       115107668 A     9/2022
DE    102021131358 A1   10/2022
(Continued)

OTHER PUBLICATIONS

Pohl et al., WO 2021004954 A1, machine translation, Jan. 14, 2021 (Year: 2021).*
(Continued)

*Primary Examiner* — Amy R Weisberg
*Assistant Examiner* — Wenwei Zhuo
(74) *Attorney, Agent, or Firm* — Harness, Dickey & Pierce, P.L.C.

(57) ABSTRACT

An antimicrobial interior component for a vehicle includes an interior component body having a contoured surface. The interior component also includes an antimicrobial jacket assembly having a first piece and a second piece coupled together and disposed over the contoured surface. The antimicrobial jacket assembly defines at least one touch surface disposed over the contoured surface of the interior component body. The first piece and the second piece each includes an antimicrobial metal material configured to prevent or minimize microbes from accumulating on the at least one touch surface.

13 Claims, 6 Drawing Sheets

(52) U.S. Cl.
CPC ... *B60R 13/0262* (2013.01); *B60R 2013/0281* (2013.01); *B60R 2013/0287* (2013.01)

(58) Field of Classification Search
CPC ...... B60R 2013/016; B60R 2013/0287; B60R 2013/0293; B29C 66/1226; B29C 66/433; B29C 66/432; B29C 66/4322; B29C 66/74281; B62D 29/001; B62D 29/005; B32B 3/06
USPC ............................ 296/39.1, 1.08, 146.7, 214
See application file for complete search history.

(56) References Cited

U.S. PATENT DOCUMENTS

| | | | |
|---|---|---|---|
| 10,125,227 | B2 | 11/2018 | Gross et al. |
| 10,166,158 | B2* | 1/2019 | Trinder, II ........... A61G 7/0507 |
| 10,259,971 | B2 | 4/2019 | Nowak et al. |
| 10,344,244 | B2 | 7/2019 | Gross et al. |
| 10,400,136 | B2 | 9/2019 | Dustin et al. |
| 10,442,935 | B2 | 10/2019 | Nelson et al. |
| 10,570,292 | B1 | 2/2020 | Rodriguez et al. |
| 10,686,917 | B2 | 6/2020 | Yang et al. |
| 10,836,974 | B2 | 11/2020 | Nowak et al. |
| 11,252,958 | B2* | 2/2022 | Trinder, II ............. A01N 59/20 |
| 11,266,756 | B2 | 3/2022 | Robincheck et al. |
| 11,421,114 | B2 | 8/2022 | Drummey et al. |
| 2011/0229728 | A1* | 9/2011 | Doye .................... B01J 23/688 428/469 |
| 2013/0143071 | A1* | 6/2013 | Kleinle ............... C23C 18/1689 29/458 |
| 2015/0086597 | A1* | 3/2015 | Mallak .................. A01N 25/34 424/407 |
| 2017/0173858 | A1* | 6/2017 | Sellin ...................... B29C 65/02 |
| 2020/0047868 | A1* | 2/2020 | Young ..................... B60R 13/02 |
| 2020/0073019 | A1 | 3/2020 | Hart et al. |
| 2020/0109294 | A1 | 4/2020 | Rodriguez et al. |
| 2020/0148896 | A1 | 5/2020 | Rodriguez et al. |
| 2020/0369002 | A1 | 11/2020 | Gross et al. |
| 2021/0179861 | A1 | 6/2021 | Robincheck et al. |
| 2021/0363361 | A1* | 11/2021 | Poteet .................... B60N 3/004 |
| 2022/0061330 | A1* | 3/2022 | Trinder, II ............. A01N 25/10 |
| 2022/0167623 | A1* | 6/2022 | Kramer .................. A01N 25/34 |
| 2022/0296742 | A1* | 9/2022 | Johnson .................... A61L 2/10 |
| 2023/0217921 | A1* | 7/2023 | Clement ............... E04F 15/105 424/412 |
| 2023/0240301 | A1* | 8/2023 | Yang ...................... A01N 59/16 424/412 |

FOREIGN PATENT DOCUMENTS

| | | | | |
|---|---|---|---|---|
| KR | 20220138902 A | * | 10/2022 | ............. A01N 59/20 |
| WO | WO-2016068737 A1 | * | 5/2016 | ............. A01N 25/08 |
| WO | WO-2021004954 A1 | * | 1/2021 | ............. B60J 5/0415 |
| WO | WO-2021223035 A1 | * | 11/2021 | ................ A01P 1/00 |

OTHER PUBLICATIONS

Anonymous, "Anti-icing Coated Ultrasonic Sensors," Research Disclosure (Aug. 16, 2017), 2 pages.

Callens, Sebastien J.P. et al., "From flat sheets to curved geometries: Origami and kirigami approaches," Materials Today, vol. 21, No. 3 (Apr. 2018), pp. 241-264; DOI: 10.1016/j.mattod,2017.10.004.

Cerda, E. et al., "Geometry and Physics of Wrinkling," Physical Review Letters, vol. 90, No. 7, 074302; (Publushed: Feb. 19, 2003) DOI: 10.1103/PhysRevLett.90.074302.

Drummey, Kevin J. et al., U.S. Appl. No. 16/775,904, filed Jan. 29, 2020 entitled, "Precursors for Forming Heterophasic Anti-Fouling Polymeric Coatings," 63 pages.

Gross, Adam F. et al., "Insect Abatement on Lubricious, Low Adhesion Polymer Coatings Measured with an Insect Impact Testing System," ADv. Polym. Sci. (2019) 284, pp. 315-332; (Published online: Dec. 27, 2017) DOI: 10.1007/12_2017_35.

Gross, Timothy M. et al., "Copper-containing glass ceramic with high antimicrobial efficacy," Nature Communciations (2019) 10, 1979; DOI: 10.1038/s41467-019-09946-9.

Robincheck, Janet C. et al., U.S. Appl. No. 16/716,029, filed Dec. 16, 2019 entitled, "Precursors for Forming Heterophasic Odor-Absorbing and Anti-Fouling Polymeric Coatings," 72 pages.

Schmidt, Michael G. et al., "Antimicrobial copper alloys decreased bacteria on stethoscope surfaces," American Journal of Infection Control (2017) 45, pp. 642-647; DOI: 10.1016/j.ajic.2017.01.030.

Selvamani, Vidhya et al., "Hierarchical Micro/Mesoporous Copper Structure with Enhanced Antimicrobial Property via Laser Surface Texturing," Adv. Mater. Interfaces (2020), 1901890; (Published: Feb. 2020) DOI: 10.1002/admi.201901890.

* cited by examiner

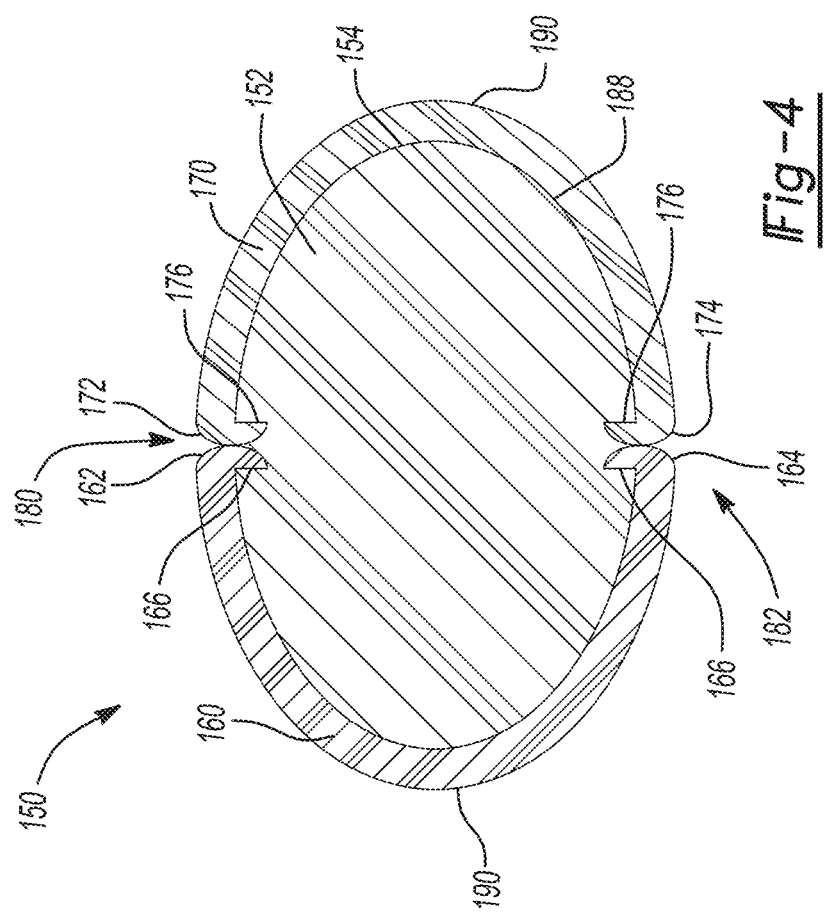
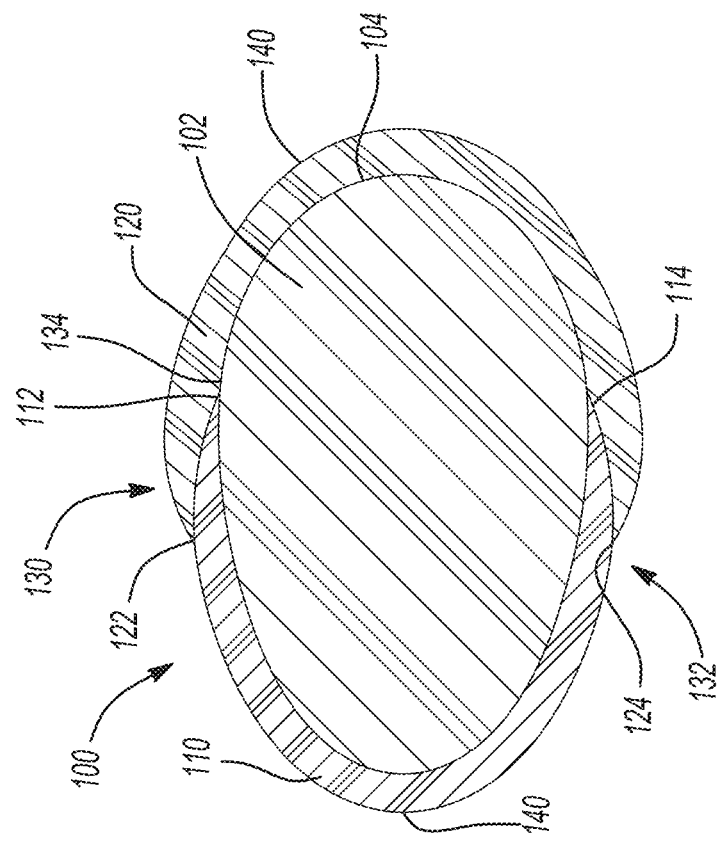

ANTIMICROBIAL METALLIC TOUCH SURFACES AND METHODS FOR MAKING THE SAME

INTRODUCTION

This section provides background information related to the present disclosure which is not necessarily prior art.

The present disclosure pertains to components for vehicles having antimicrobial metallic surfaces and methods for use thereof.

Transmission of diseases and odors in vehicles are a major concern, especially for ride-sharing or multi-occupant vehicles. Certain interior components of vehicles have buttons, switches, levers, handles, or other surfaces that are frequently touched by users ("high interaction vehicle surfaces" or "high touch areas"). Thus, cleaning of these high touch surfaces to remove pathogenic bacteria or unwanted odors generated by bacteria in human sweat and food residue is desirable. While various disinfecting strategies have been employed in vehicles, many of these rely on physical cleaning by a human, such as applying a cleanser directly to the surface, sometimes followed by physical contact, like wiping.

However, certain high touch regions of interior components may be difficult to clean as they are disposed in a confined area lacking easy access. For example, the interior portions of handles, latches, cup holders, center console compartments, and the like, may have high touch surfaces that cannot be easily accessed for cleaning or may have surface contours and complex shapes that make thorough cleaning difficult. Thus, it would be desirable to provide components having antimicrobial properties on high interaction vehicle surfaces so that microbial transmittance can be reduced in difficult to access regions of interior components. Thus, there remains a need for self-cleaning and self-sanitizing antimicrobial high touch surfaces capable of safely minimizing microbes and other contaminants in regions of the interior component that are difficult to access.

SUMMARY

This section provides a general summary of the disclosure, and is not a comprehensive disclosure of its full scope or all of its features.

The present disclosure relates to an antimicrobial interior component for a vehicle that includes an interior component body having a contoured surface. The antimicrobial interior component also includes an antimicrobial jacket assembly including a first piece and a second piece coupled together and disposed over the contoured surface. The antimicrobial jacket assembly defines at least one touch surface disposed over the contoured surface of the interior component body. The first piece and the second piece each include an antimicrobial metal material configured to prevent or minimize microbes from accumulating on the at least one touch surface.

In one aspect, the first piece defines a first edge and the second piece defines a second edge. The first piece and the second piece are coupled together at an interface between the first edge and the second edge so that the first edge overlaps with the second edge.

In one aspect, the first piece defines a first edge and the second piece defines a second edge. The first piece and the second piece are coupled together at an interface that is free of any sharp protrusions or protruding seams. The at least one touch surface of the antimicrobial jacket assembly is substantially free of any wrinkling.

In one aspect, the first piece defines a first edge and the second piece defines a second edge. The first piece and the second piece are coupled together at an interface defining at least one gap that is configured to permit thermal expansion.

In one aspect, the first piece and the second piece are coupled together at an interface by one or more of: an adhesive, mechanical deformation of at least a portion of the first piece to at least a portion of the second piece, or mechanical deformation of the first piece and the second piece into the contoured surface of the interior component body.

In one aspect, the first piece and the second piece are coupled together at an interface defining an interlock with complementary mating features on the first piece and the second piece.

In one aspect, the antimicrobial metal material includes copper or a copper alloy having at least 60% by weight of copper.

In one aspect, the antimicrobial component is selected from the group consisting of: a handle, a steering wheel, a shifter, a button, a switch, a lever, a latch, a cup holder, a center console, a glove compartment, and combinations thereof.

In one aspect, the first piece and the second piece entirely surround a circumference of the interior component body.

In one aspect, at least one of the first piece or the second piece includes a first feature and the contoured surface of the interior component body includes a second feature. The first feature is complementary to the second feature. The features are configured to align and attach the first piece or the second piece to the interior component body.

The present disclosure further relates to an antimicrobial component for a vehicle including an interior component body having a contoured surface. The antimicrobial component includes an antimicrobial jacket assembly including a first metal piece and a second metal piece coupled together and adhered to the contoured surface. The antimicrobial jacket assembly defines at least one touch surface over the contoured surface of the interior component body. The first metal piece and the second metal piece each have a thickness of less than or equal to about 0.51 mm and each includes an antimicrobial copper-based material configured to prevent or minimize microbes from accumulating on the at least one touch surface and the at least one touch surface is substantially free of wrinkles.

The present disclosure also relates to a method of forming an antimicrobial interior component for a vehicle including coupling a first piece and a second piece together to form an antimicrobial jacket assembly that is complementary to and disposed over a contoured surface of an interior component body. The antimicrobial jacket assembly defines at least one touch surface and the first piece and the second piece each include an antimicrobial metal material configured to prevent or minimize microbes from accumulating on the at least one touch surface.

In one aspect, the method further includes stamping or hydroforming the first piece and the second piece from a sheet of the antimicrobial metal material prior to the coupling.

In one aspect, the method further includes chemically, thermally, or electrochemically treating exposed surfaces of the first piece and the second piece.

In one aspect, the method also includes adhering or attaching the first piece and the second piece of the antimicrobial jacket assembly to the contoured surface of the antimicrobial interior component by applying one or more of: applying an adhesive, applying heat, or physical deformation.

In one aspect, the first piece and the second piece are heated around the interior component body.

In one aspect, the method further includes modeling the contoured surface of the interior component body and dividing the exposed surface into sub-sections to avoid wrinkling of the antimicrobial metal material, wherein the sub-sections correspond to the first piece and the second piece that fit together to define the at least one touch surface.

In one aspect, the method further includes designing overlapping seams of the first piece and the second piece.

In one aspect, the method further includes overlapping a first edge of the first piece with a second edge of a second piece to create an interface that is free of any sharp protrusions or protruding seams.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 3 shows a cross-sectional view of an antimicrobial interior component having one variation of an antimicrobial metallic jacket disposed thereon in accordance with certain aspects of the present disclosure.

FIG. 4 shows a cross-sectional view of an antimicrobial interior component having another variation of an antimicrobial metallic jacket disposed thereon in accordance with certain aspects of the present disclosure.

Corresponding reference numerals indicate corresponding parts throughout the several views of the drawings.

DETAILED DESCRIPTION

Figure 1:
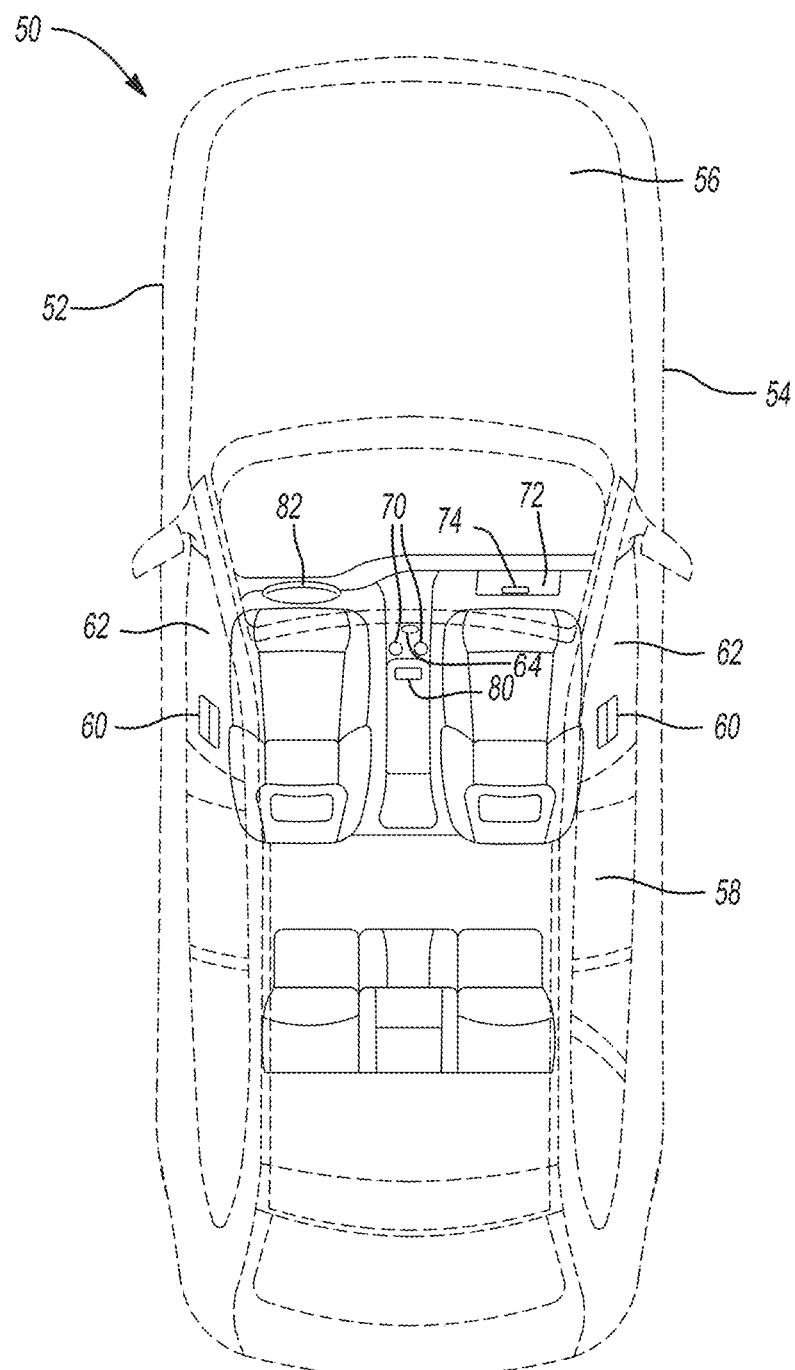
FIG. 1 is a schematic of a vehicle interior in which antimicrobial interior components may be incorporated in accordance with certain aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure provides an antimicrobial or self-sanitizing surface on an interior component in a vehicle and methods for killing, inactivating, or minimizing growth of microbes or pathogens in such an interior component. Microbes include bacteria, viruses, fungi, and the like. Thus, antimicrobial as used herein may include antibacterial, antiviral, and/or antifungal efficacy. The interior component according to the present disclosure may have at least one touch or high use surface, which in certain variations may be situated in a confined space. A confined space in an interior component may be an area of a passenger compartment that is a relatively small volume, for example, less than or equal to about 2 cubic feet or optionally less than or equal to about 1 cubic foot. In certain other aspects, a confined space may be one that does not permit full physical access for thorough cleaning.

In certain aspects, the interior component has at least one contoured surface that may be a high use or touch surface that users contact, which is antimicrobial and thus capable of killing, inactivating, or minimizing growth of microbes on the surface. By a "contoured surface," it is meant that at least a portion of the interior component has a three-dimensional shape, meaning that the shape has at least one contoured region that is not flat (e.g., two-dimensional), but rather is curved, convex, concave, protruding or inverted, by way of example. As will be described in further detail below, a contoured surface may be one having a curvature that creates greater than or equal to about 0.5% biaxial strain over a region (e.g., sub-section) of the contoured surface, optionally greater than or equal to about 1% of biaxial strain, optionally greater than or equal to about 2% of biaxial strain, or in certain variations, optionally greater than or equal to about 3% of biaxial strain. The three-dimensional shape may include a variety of complex surface contour patterns to form complex three-dimensional shapes. Such contoured surfaces may define complex three-dimensional shapes that may likewise be difficult to thoroughly clean, especially when disposed in a confined space in the interior component. The component itself may be formed of a material on which microbes can grow or accumulate, such as a polymeric material (e.g., thermoplastic olefin (TPO), polypropylene, vinyl), leather, fabric (e.g., woven or knit foam-backed fabric), metallic, metal-plated, or any other typical material typically used for forming interior components in a vehicle.

According to one embodiment of the present disclosure, FIG. 1 shows a vehicle 50 including a chassis 52 and a body 54 supported by the chassis 52. As shown, the body 54 includes a motor compartment 56 and a cabin or interior 58 that one or more occupants (e.g., driver or passengers) can occupy. The vehicle 50 further includes at least one self-sanitizing antimicrobial metallic component prepared in accordance with the present disclosure in the cabin 58. While not shown, it will be appreciated that the self-sanitizing antimicrobial component may also be on an exterior of the vehicle 50, as well. In certain aspects, the antimicrobial component is selected from the group consisting of: a handle, a steering wheel, a shifter, a button, a switch, a lever, a latch, a cup holder, a glove compartment, a center console, and combinations thereof. For example, as shown by way of non-limiting example in FIG. 1, in certain variations, the antimicrobial component is selected from the group consisting of: a door handle 60 in a door 62, a shifter 64, a cup holder 70, a glove compartment 72, a latch 74, a center console 80, a steering wheel 82, and the like, and combinations thereof.

It should be noted that the antimicrobial components provided by the present technology are particularly suitable for use in an automobile or in other vehicles (e.g., motorcycles, boats, tractors, buses, motorcycles, trains, mobile homes, campers, and tanks), in alternative aspects, they may also be used in a variety of other industries and applications, including aerospace components, consumer goods, devices, buildings (e.g., houses, offices, sheds, warehouses), office equipment and furniture, and industrial equipment machinery, agricultural or farm equipment, or heavy machinery, by way of non-limiting example.

Certain metals have oligodynamic biocidal or antimicrobial properties that can kill, inactivate, or minimize growth of microbes. However, if such metals are cast as solid metal pieces to form a component for a vehicle, the part would be weight prohibitive and expensive. Moreover, metal surfaces with any curvatures or contoured surfaces cannot be used with antimicrobial appliques or surface laminations, because a thin applique tends to wrinkle on curved/contoured surfaces showing aesthetic defects.

Figure 2:
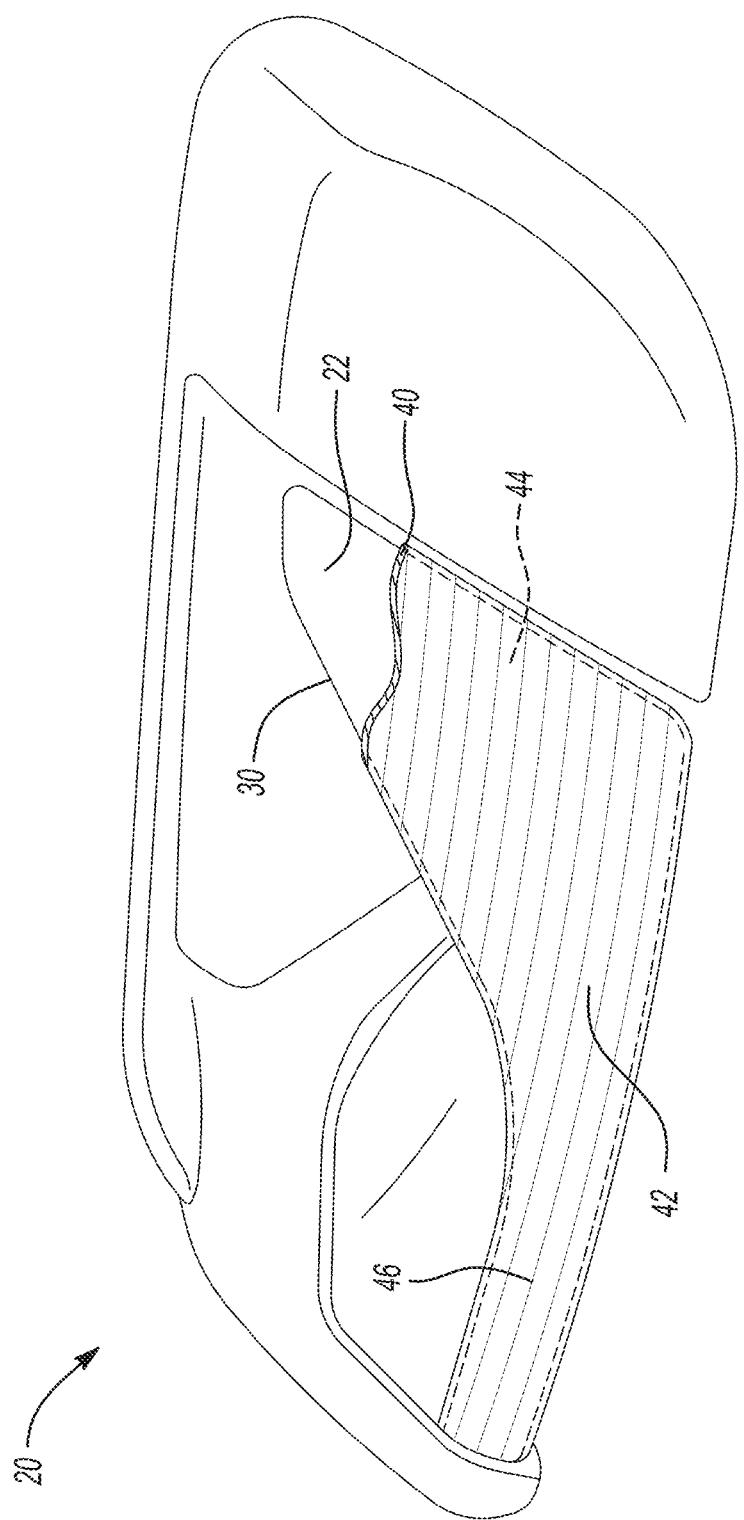
FIG. 2 shows a vehicle door handle having an antimicrobial metallic jacket disposed on a door handle component in accordance with certain aspects of the present disclosure.

In various aspects, the present disclosure provides an antimicrobial component for a vehicle, such as a door handle 20 shown in FIG. 2. The antimicrobial component, like door handle 20, may include an interior component body 22 having a contoured surface 30 with multiple curved regions. It may also have an antimicrobial jacket assembly 40 disposed over the contoured surface 30. The antimicrobial jacket assembly 40 comprises a first piece 42 and a second piece 44 coupled together and disposed over the contoured surface 30. The antimicrobial jacket assembly 40 includes at least two distinct pieces joined or coupled together, but are not limited to only two pieces. The antimicrobial interior component 40 is made of at least two pieces to define a complex shape that can be easily manufactured. As will be described below, the antimicrobial interior component 40 may also have a hinge, an interlock, or locking mechanism depending on the shape formed. This can simplify installation and bonding. The antimicrobial jacket assembly 40 defines at least one touch surface 46 disposed over the contoured surface 30 of the interior component body 22. The first piece 42 and the second piece 44 each comprises an antimicrobial metal material configured to prevent or minimize microbes from accumulating on the at least one touch surface.

Antimicrobial metal surfaces are advantageous over other antimicrobial materials, because they are long-lasting and durable. A metal is generally considered an electrically conductive solid with an average oxidation state of about 0. A metal may have oxides formed on an exposed surface layer. Certain metals exhibit antimicrobial properties and are advantageous because they are not irritants to human skin and eyes, like many other molecular antimicrobials. Further, antimicrobial metal materials are structural materials versus other antimicrobials are fillers or must be added to other materials which dilutes them. Copper (Cu), zinc (Zn), and silver (Ag) are known antimicrobial metals. For example, copper and silver have U.S. Environmental Protection Agency (EPA) registrations as antimicrobial materials. Copper and its alloys tend to be used more extensively because of its better environmental stability and lower cost than silver.

In certain aspects, the antimicrobial metal material used in the component in accordance with certain aspects of the preset disclosure comprises copper or a copper alloy having at least 60% by weight of copper. In certain variations, the copper or a copper alloy has greater than or equal to about 60% by weight of copper to less than or equal to about 99.9 weight %. Such alloys are typically sold commercially as solid flat sheets, which as described herein may be hydroformed or shaped to create pieces of an antimicrobial interior component. In particular, the antimicrobial metal material may be a copper alloy selected from the group consisting of: C75200, C70600, C71000, C26000, C11000 and alloys thereof. These copper alloys have the following nominal compositions set forth in Tables 1-5. As appreciated by those of skill in the art, these compositions may vary and potentially include impurities cumulatively present at less than or equal to about 1 weight %, optionally less than or equal to about 0.5 weight %, and optionally less than or equal to about 0.1 weight %.

TABLE 1

C75200 Alloy Composition

| Element | Cu | Pb | Zn | Fe | Ni | Mn |
|---|---|---|---|---|---|---|
| Minimum (wt. %) | 63.0 | | | | 16.5 | |
| Maximum (wt. %) | 66.5 | 0.05 | Balance | 0.25 | 19.5 | 0.50 |

TABLE 2

C70600 Alloy Composition (copper nickel alloy 90/10)

| | Cu | Mn | Ni |
|---|---|---|---|
| (wt. %) | 88.7 | 1.3 | 10 |

TABLE 3

C71000 Alloy Composition

| Element | Cu | Pb | Zn | Fe | Ni | Mn |
|---|---|---|---|---|---|---|
| Minimum (wt. %) | | | | | 19 | |
| Maximum (wt. %) | Balance | 0.05 | 1 | 1 | 23 | 1 |

TABLE 4

C26000 Alloy Composition

| Element | Cu | Pb | Zn | Fe | Ni | Mn |
|---|---|---|---|---|---|---|
| Minimum (wt. %) | 68.5 | | | | 19 | |
| Maximum (wt. %) | 71.5 | 0.07 | 28.5 | 0.05 | 23 | 0.15 |

TABLE 5

C11000 Alloy Composition

| | Cu* |
|---|---|
| (wt. %) | 99.9 |

*Copper may be substituted by Silver (Ag)

In certain variations, an antimicrobial copper or copper alloys may be used, including the 479 alloys registered with the Environmental Protection Agency (EPA) by the Copper Development Association. In certain variations, the antimicrobial copper alloys may have an EPA registration number 082012-00001 through 082012-00006, the compositions of which are listed below in Table 6. These copper alloys have a copper (Cu) content of greater than or equal to about 62 weight % to less than or equal to about 96.2 weight %.

TABLE 6

| EPA Antimicrobial Copper Alloy Group | EPA Registration No. | Copper (Cu) content Weight % | Other ingredients Weight % |
|---|---|---|---|
| I | 82012-00001 | 96.2 | 3.8 |
| II | 82012-00002 | 91.3 | 8.7 |
| III | 82012-00003 | 82.6 | 17.4 |
| IV | 82012-00004 | 73.0 | 27.0 |

TABLE 6-continued

| EPA Antimicrobial Copper Alloy Group | EPA Registration No. | Copper (Cu) content Weight % | Other ingredients Weight % |
|---|---|---|---|
| V | 82012-00005 | 66.5 | 33.5 |
| VI | 82012-00006 | 62.0 | 38.0 |

The multidimensional curved, interlocking pieces can that form the antimicrobial interior component can be made by industrially scalable stamping or hydroforming and can be applied on complex-shaped parts. Further, the antimicrobial interior component only adds minimal weight to the component, because the amount of metal is limited as each piece in the jacket assembly is only a thin shell. In certain aspects, each piece forming the antimicrobial interior component 40 may have a total thickness of greater than or equal to about 2 micrometers to less than or equal to about 2 mm. For example, in certain aspects, a thickness of each piece forming the antimicrobial jacket assembly may optionally be in a range of greater than or equal to about 2.54 μm (0.00254 mm or 0.1 mil) to less than or equal to about 0.51 mm (500 μm or about 20 mil).

In certain aspects, a touch surface of the antimicrobial metal material has a finish that may range from matte to polished. Surface uniformity is important for damage resistance. A texture of the surface on both the outer surface and inner surface can be created in the tool for each piece. Alternatively, a secondary application to provide a pattern on the surface, such as a brushed pattern, can be used. This texture can improve grip on the exterior of the contoured surface of the interior component and create roughness on the interior surface to improve bonding.

Copper alloys can potentially tarnish in the environment or form a patina to varying degrees. To maintain appearance of a component surface over time thus requires appropriate alloy selection and can include thermal, chemical, or electrochemical treatments to treat (e.g., "pre-age") the copper surface. This can include oxidizing chemical treatments to form a patina on the surface, acid treatments with ammonia vapor, treatment in basic salt solution to roughen the surface and create a matte finish, or heating the alloy in a dry oven, or in an oven with humidity. For example, the antimicrobial metal surface may be thermally or chemically treated to improve environmental durability. In other aspects, it may be desirable to pre-age the antimicrobial metal surface because of slight darkening. The antimicrobial metal surface may be thermally or chemically treated to pre-age the appearance and thus limit the change in appearance over time. These treatments may include thermal, chemical, or electrochemical oxidation or other reactions to provide a desirable patina. Alternately, environmental aging can be minimized by alloy selection. By way of non-limiting example, alloy environmental aging shows C26000 and "nickel silver" C75200 appear to age with the least discoloration.

Treatments may include chemical treatments to brighten the surface. These contain acids (sulfuric, hydrochloric, nitric, or phosphoric) and optionally oxidizers, such as hydrogen peroxide. The antimicrobial metal pieces may also be treated with heat with and without water vapor (humidity). By way of example, the applied heat may be greater than or equal to about 50° C. to less than or equal to about 200° C. The treatment may occur in an oxidizing, inert, or reducing atmosphere. Treatments may also include a protective dip containing chromate salts, chromic acid, or organic additives, by way of example.

In certain aspects, an antimicrobial jacket assembly comprises a first piece and a second piece coupled together and disposed over the contoured surface of an interior component body. Different variations of such antimicrobial jacket assemblies are shown in FIGS. 3-6. In FIG. 3, an antimicrobial jacket assembly 100 is disposed over an interior component body 102 that is a solid body defining a contoured surface 104 (here having a concave curved elliptical cross sectional shape). The antimicrobial jacket assembly 100 comprises a first piece 110 and a second piece 120, each of which may be formed of an antimicrobial metal material configured to prevent or minimize microbes from accumulating, as described above. The first piece 110 defines both a first edge 112 and a second edge 114. The second piece 120 defines both a first edge 122 and a second edge 124. In the embodiment shown in FIG. 3, the first piece 110 and the second piece 120 are coupled together at both a first interface 130 and a second interface 132. At the first interface 130, the first edge 122 of the second piece 120 overlaps with the first edge 112 of the first piece 110. At the second interface 132, the second edge 114 of the first piece 110 and the second edge 124 of the second piece 120 overlap with one another. In various aspects, the first piece 110 and the second piece 120 may be coupled together at an interface (either 130 or 132) by one or more of: an adhesive disposed between overlapping regions or between adjacent edges of the first and second pieces or by mechanical deformation of at least a portion of the first piece to at least a portion of the second piece. By way of example, the pieces may be crimped or glued together. Suitable adhesives include by way of non-limiting example, epoxies, polyurethanes, acrylics, and combinations thereof. Adhesive may also be applied between the contoured surface 104 of the interior component body 102 and first piece 110 and/or the second piece 120. In other aspects, the pieces may be welded together.

In this variation, the first piece 110 and the second piece 120 entirely surround a perimeter or circumference 134 of the interior component body 102. It should be noted that entirely surrounding is meant that the antimicrobial jacket assembly 100 covers a circumference or perimeter of the component body 102 in at least one area (for example, two dimensionally surrounds the interior component body 102). In other words, the antimicrobial jacket assembly 100 is disposed circumferentially around the interior component body 102. The first piece 110 and the second piece 120 and any other additional pieces can overlap in most areas, but it will be appreciated that the antimicrobial jacket assembly 100 may not provide 100% surface area coverage of the contoured surface. Rather, the antimicrobial jacket assembly 100 may cover the high touch regions of the contoured surface and thus, may only be selectively covering the contoured surface. In certain variations, the antimicrobial jacket assembly 100 may fully cover (100%) of the contoured surface of the interior component body 102.

The antimicrobial jacket assembly 100 thus defines a touch surface 140 over the contoured surface 104 of the interior component body 102, with which a user interfaces. The first piece 110 and the second piece 120 are thus coupled together at both the first interface 130 and the second interface 132, where each of the interfaces is free of any sharp protrusions or protruding seams, which could be discerned tactilely by a user. The mated edges (first edge 122 with first edge 112 and second edge 114 with second edge 124) allow for no sharp or tactilely unpleasant seams. These smooth interfaces can be formed by shaping the antimicrobial metal into at least two pieces or sub-surfaces that fit together, where the edges of one sub-surface piece overlaps the edges of the other sub-surface piece. Thus, the first piece 110 and the second piece 120 are coupled together at the first interface 130 and the second interface 132 and are smooth along the at least one touch surface 140 including over the first interface 130 and second interface 132.

Moreover, in certain variations as will be described below, the antimicrobial jacket assemblies 50 and 100 in FIGS. 2 and 3 and various other embodiments provided by the present disclosure are substantially free of any wrinkling. In accordance with certain aspects of the present disclosure, the term "substantially free" as referred to herein means that the defect of wrinkles is absent to the extent that that undesirable and/or detrimental effects attendant with its presence are avoided, for example, visible wrinkles on a macroscale that mar continuous surface reflectivity. Thus, wrinkles on the microscale may be present to the extent that they do not impact the aesthetics of the touch surface of the component.

FIG. 4 shows another embodiment of an antimicrobial jacket assembly 150 is disposed over an interior component body 152 defining a contoured surface 154 (here having a concave curved elliptical cross sectional shape). The antimicrobial jacket assembly 150 comprises a first piece 160 and a second piece 170, each of which may be formed of an antimicrobial metal material configured to prevent or minimize microbes from accumulating, as described above. The first piece 160 defines both a first edge 162 and a second edge 164. Each of the first edge 162 and second edge 164 define a protrusion or lip 166 that is oriented substantially orthogonal to the contoured surface 154 and thus facing away from an exposed surface. The second piece 170 defines both a first edge 172 and a second edge 174. Each of the first edge 172 and second edge 174 define a protrusion or lip 176 that is oriented substantially orthogonal to the contoured surface 154. Each lip 166 of first piece 160 or lip 176 of second piece 170 can be formed by mechanical deformation. The lips 166, 176 may be forced (e.g., by mechanical force or deformation) into the contoured surface 154 of the interior component body 152, so that the first piece 160 and the second piece are affixed with respect to one another.

In the embodiment shown in FIG. 4, the first piece 160 and the second piece 170 are disposed adjacent to one another at both a first interface 180 and a second interface 182 and coupled to the interior component body 152. At the first interface 180, the first edge 172 of the second piece 170 is disposed adjacent to the first edge 162 of the first piece 160. At the second interface 182, the second edge 164 of the first piece 160 is disposed adjacent to the second edge 174 of the second piece 170. In this variation, the first piece 160 and the second piece 170 entirely surround a perimeter or circumference 188 of the interior component body 152. The antimicrobial jacket assembly 150 thus defines a touch surface 190 over the contoured surface 154 of the interior component body 152, with which a user interfaces.

Figure 5:
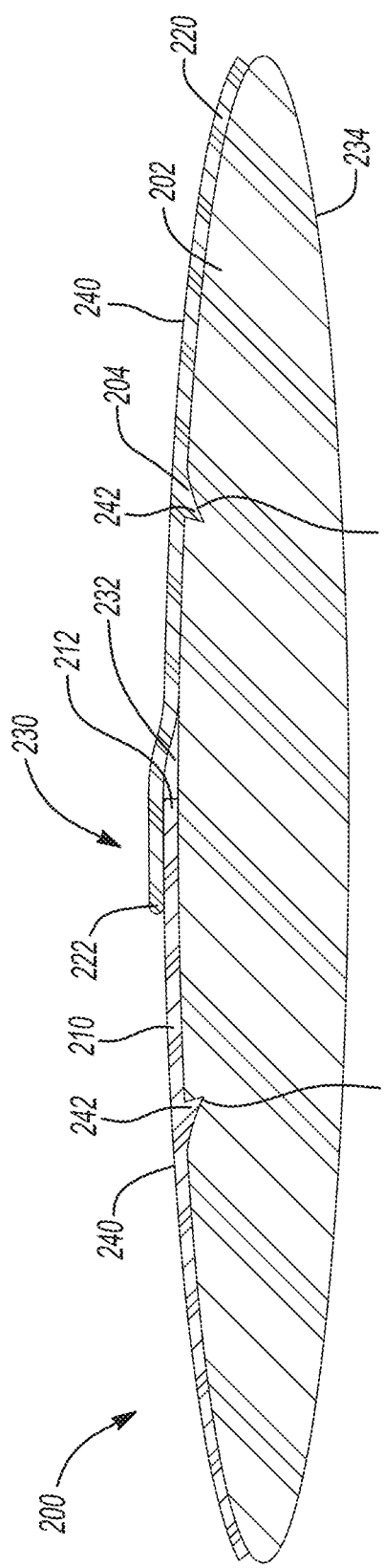
FIG. 5 shows a cross-sectional view of an antimicrobial interior component of yet another variation of an antimicrobial metallic jacket disposed thereon in accordance with certain aspects of the present disclosure.

An antimicrobial jacket assembly 200 in FIG. 5 is another variation that permits differential thermal expansion between the underlying components and the metallic shell or jacket assembly. The antimicrobial jacket assembly 200 is disposed over an interior component body 202 defining a contoured surface 204 (here having a concave curved elliptical cross sectional shape). The antimicrobial jacket assembly 200 comprises a first piece 210 and a second piece 220, each of which may be formed of an antimicrobial metal material configured to prevent or minimize microbes from accumulating, as described above. The first piece 210 defines a first edge 212. The second piece 220 defines a first edge 222. In the embodiment shown in FIG. 5, the first piece 210 and the second piece 220 are coupled together at a single interface 230. At the interface 230, the first edge 222 of the second piece 220 overlaps with the first edge 212 of the first piece 210. A gap 232 is provided between the first piece 210 and second piece 220. The gap 232 may allow for manufacturing variances in component dimensions, in other words, a space built in to accommodate manufacturing tolerances of the underlying part. The gap 232 may be configured to permit thermal expansion based on the use of materials in close proximity to one another having different heat capacity values (e.g., the interior component body 202 may be formed of a non-metallic material or a different metal alloy having different heat capacities than the antimicrobial metal material forming the first piece 210 and the second piece 220). The inclusion of the gap 232 permits expansion of the respective materials without causing permanent shifting of the positions through a range of operating temperatures. Notably, as with previous embodiments, the first piece 210 and the second piece 220 may be coupled together at the interface 230 by use of one or more of: an adhesive disposed between overlapping regions or between adjacent edges of the first and second pieces or by mechanical deformation of at least a portion of the first piece to at least a portion of the second piece. Furthermore, the first piece 210 or the second piece 220 may be adhered or otherwise affixed to the contoured surface 204 of the interior component body 202. Moreover, the first piece 210 or the second piece 220 and the contoured surface 204 of the interior component body 202 may have complementary mating features to affix and/or align the pieces of the jacket assembly to the component. Here, each of the first piece 210 and the second piece 220 has a protruding region 242 that seats in complementary recessed regions 244 on the contoured surface 204. In this manner, the complementary features are configured to physically align the first piece and the second piece with the contoured surface of the interior component body. Notably, any of these techniques for associating the pieces of the antimicrobial jacket assembly to the underlying interior component body may be used in any of the embodiments described in the context of the present disclosure.

In this variation, the first piece 210 and the second piece 220 only partially surround half a perimeter or circumference 234 of the interior component body 202. The antimicrobial jacket assembly 200 thus defines a touch surface 240 over the contoured surface 204 of the interior component body 202, with which a user interfaces. The first piece 210 and the second piece 220 are thus coupled together at the interface 230 that is free of any sharp protrusions or protruding seams, which could be discerned tactilely by a user. The mated edges (first edge 212 with first edge 222 may be smooth or rounded) and provides for no sharp or tactilely unpleasant seams. These smooth interfaces can be formed by shaping the antimicrobial metal into at least two pieces or sub-surfaces that fit together, where the edges of one sub-surface piece overlaps the edges of the other sub-surface piece. Thus, the first piece 210 and the second piece 220 are coupled together at the interface 230 and are smooth along the entire touch surface 240 including over the interface 230.

Figure 6:
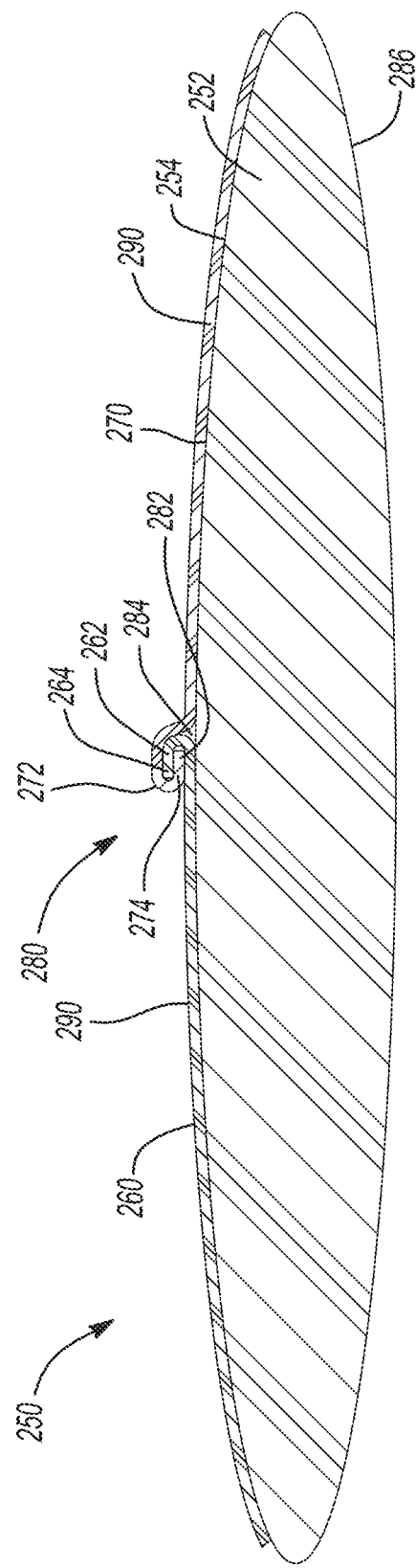
FIG. 6 shows a cross-sectional view of an antimicrobial interior component having another variation of an antimicrobial metallic jacket disposed thereon in accordance with certain aspects of the present disclosure.

Yet another antimicrobial jacket assembly 250 is shown in FIG. 6 is another variation that permits differential thermal expansion between the underlying components and the metallic shell or jacket assembly and further has an interface that defines an interlock with complementary mating features. The antimicrobial jacket assembly 250 is disposed over an interior component body 252 defining a contoured surface 254 (here having a concave curved elliptical cross sectional shape). The antimicrobial jacket assembly 250 comprises a first piece 260 and a second piece 270, each of which may be formed of an antimicrobial metal material configured to prevent or minimize microbes from accumulating, as described above.

The first piece 260 defines a first edge 262. The second piece 270 defines a first edge 272. In the embodiment shown in FIG. 6, the first piece 260 and the second piece 270 are coupled together at a single interface 280. At the interface 280, an interlock 282 is formed with complementary mating features defined on first edge 262 of the first piece 260 and on second edge 272 on the second piece 270. The complementary mating features include each first edge 262 having a lip 264 and first edge 272 having a lip 274. The lip 264 of the first piece 260 and lip 274 of the second piece 270 can each define a 180° turn at the edge that defines complementary mating pieces that can nest within one another to define the interlock 282. In this manner, the first piece 260 and the second piece 270 are coupled together and physically aligned with the contoured surface 254 of the interior component body 252. Notably, the interlock 282 may serve as a hinge to permit movement of the first piece 260 with respect to the second piece 270.

Additionally, a gap 284 is optionally provided between the first piece 260 and second piece 270 near the interlock 282, which may be configured to account for manufacturing tolerances and/or to permit thermal expansion based on the use of materials having different heat capacities in close proximity to one another in the same manner as described previously above. While not shown, the first piece 260 or the second piece 270 may be adhered or otherwise affixed to the contoured surface 254 of the interior component body 252.

In this variation, the first piece 260 and the second piece 270 only partially surround half a perimeter or circumference 286 of the interior component body 252. The antimicrobial jacket assembly 250 thus defines a touch surface 290 over the contoured surface 254 of the interior component body 252 with which a user interfaces. The first piece 260 and the second piece 270 are thus coupled together at the interface 280 that is rounded and provides for no sharp or tactilely unpleasant seams. These smooth interfaces can be formed by shaping the antimicrobial metal into at least two pieces or sub-surfaces that fit together, where the edges formed into a lip of one sub-surface piece mate with the edges formed into a lip of the other sub-surface piece.

The present disclosure also provides methods to form and adhere the respective pieces of the antimicrobial jacket assembly to an underlying component. In one aspect, the methods include forming an antimicrobial interior component for a vehicle that comprises creating an antimicrobial jacket assembly of multiple pieces for an interior component body having a contoured surface. The antimicrobial jacket assembly comprises a first piece and a second piece coupled together and disposed over the contoured surface. The antimicrobial jacket assembly defines at least one touch surface disposed over the contoured surface of the interior component body, wherein the first piece and the second piece each comprises an antimicrobial metal material configured to prevent or minimize microbes from accumulating on the at least one touch surface.

Figure 7:
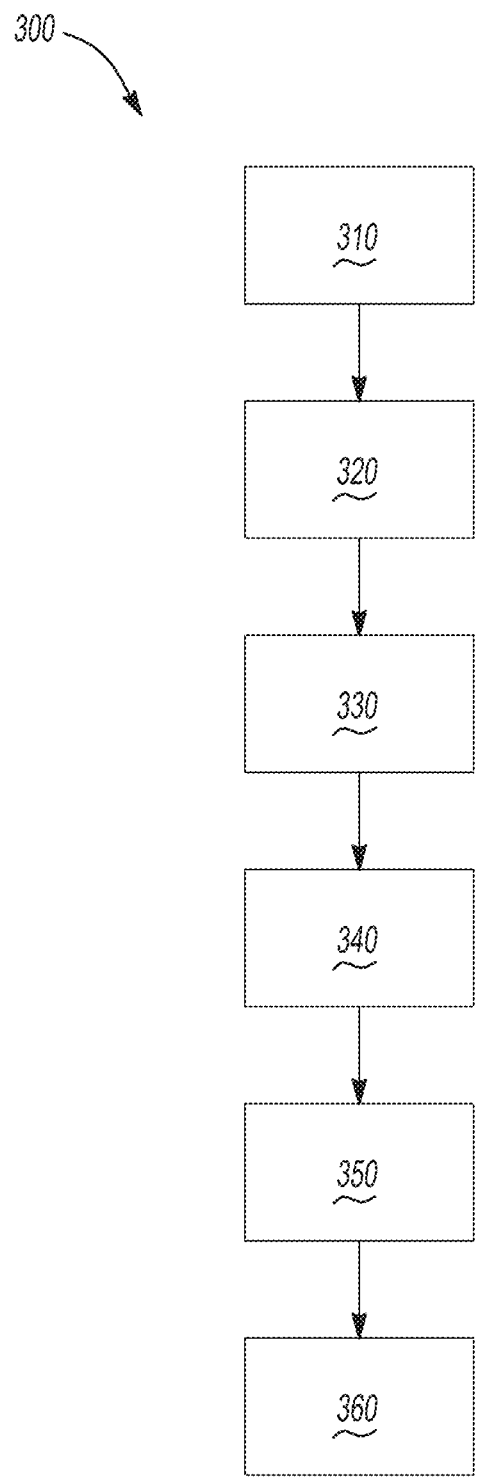
FIG. 7 shows a flow chart of a method of forming an antimicrobial metallic jacket over a contoured surface of an antimicrobial interior component in accordance with certain aspects of the present disclosure.

In certain variations, such a method of forming an antimicrobial interior component for a vehicle that comprises creating an antimicrobial jacket assembly of multiple pieces may include first evaluating an interior component body having a contoured surface, such as the method 300 shown in FIG. 7. As described previously above, a contoured surface may be one considered to have a curvature that creates greater than or equal to about 0.5% biaxial strain over a region (e.g., sub-section) of the contoured surface or any of the other levels of biaxial strain specified above. For example, the method 300 may include modeling a contoured surface of the interior component body. This may be done by obtaining math data of the vehicle interior component at 310, including math data regarding the contoured surface. For example, the surface can be scanned three dimensionally (3D) to obtain math data or predetermined math data may be input (e.g., math data provided by the manufacturer). The math data can be analyzed in a program like SolidWorks™. Next, at 320, the contoured surface may be broken up into sub-sections formed by taking a three dimensional (3D) surface (not solid) and breaking it into multiple sections that will fit together to form parts or all of the original surface (so they may cover only portions of the exposed surface). Thus, the contoured surface may be broken up into sub-sections that correspond to metal pieces of the antimicrobial jacket assembly that will not wrinkle, based on maximum allowable strain for the antimicrobial metal material selected. For example, a thickness of each piece for the antimicrobial jacket assembly may be adjusted to make the wrinkle wavelength longer than the piece/sub-section dimensions to have a two dimensional curved wrinkle free parts. The formation of multiple pieces corresponding to the subsections of the surface ensures that the pieces are smaller than the wrinkle wavelength to avoid formation of wrinkles on each piece.

As background, flat metals sheets can wrinkle when applied onto two dimensional (2D) surfaces to relieve strain. The conditions for wrinkling of solid sheets, for example, of copper alloys can be calculated and these predictions used to select materials forming wrinkle-free appliques or jackets on sub-sections of the contoured surface of the interior component.

Application of flat sheets to surfaces with complex curvature results in localized extension and compression in regions with positive and negative curvature, respectively. The imparted strain leads to distortion of the sheet which is aesthetically undesirable. For flat sheets, the distortion is represented through a balance of the elastic energy (E) which is comprised of a stretching ($E_s$) and bending component ($E_b$).

$$E = E_s + E_b$$

To maintain a locally flat surface, the bending component is minimized by optimizing the thickness (t). The stretching energy, $E_s$, is proportional to t and the bending energy, $E_b$, is proportional to $t^3$, which are expressed in the equations below (from S. J. P. Callens and A. A. Zadpoor, "From flat sheets to curved geometries: Origami and kirigami approaches," *Materials Today*, 2018, 21, 241-264, the relevant portions of which are incorporated herein by reference).

$$E_s = \frac{1}{2} \int_A T(x) \left( \frac{\partial^2 \zeta}{\partial x^2} \right)^2 dA$$

$$E_b = \frac{1}{2} \int_A B \left( \frac{\partial^2 \zeta}{\partial y^2} \right)^2 dA$$

where $T(x) = E \gamma t$, $\zeta$ is the out of plane displacement, $$B = \frac{Et^3}{12(1-v^2)},$$

E is the elastic modulus, γ is the in-plane strain, and ν is the Poisson's ratio. The size and spacing of these defects can be predicted through a wrinkling analysis following E. Cerda and L. Mahadevan, "Geometry and Physics of Wrinkling," *Phys. Rev. Lett.*, 2003, 90, 074302, the relevant portions of which are incorporated by reference herein, where a thin, (t<<W<<L) isotropic, and inextensible sheet of thickness, t, width, W, and length, L, is pulled with a tension, T, creating a biaxial strain state and inducing wrinkling.

Although, this example is not necessarily representative of the complex biaxial strain state that occurs when applying copper sheets to door handles, it serves as a reasonable approximation due to the incompressibility of the copper under the relatively low strain magnitudes, γ≥2%, experienced here. The resulting wrinkle wavelength (λ) and amplitude (A) are provided in the equations below, respectively, and are illustrated as a function of strain and thickness in FIG. 8.

$$\lambda = \frac{\sqrt{2\pi Lt}}{[3\gamma(1-v^2)]^{\frac{1}{4}}}$$

$$A = \frac{\sqrt{vLt}}{\left[\frac{16\gamma}{3\pi^2}(1-v^2)\right]^{\frac{1}{4}}}$$

The wrinkle wavelength of copper sheets increases with both strain and thickness. While strain is fixed by the shape of a component, increasing copper thickness and limiting sub-section size will lead to a wrinkle wavelength greater than the dimensions of the part itself.

Figure 8:
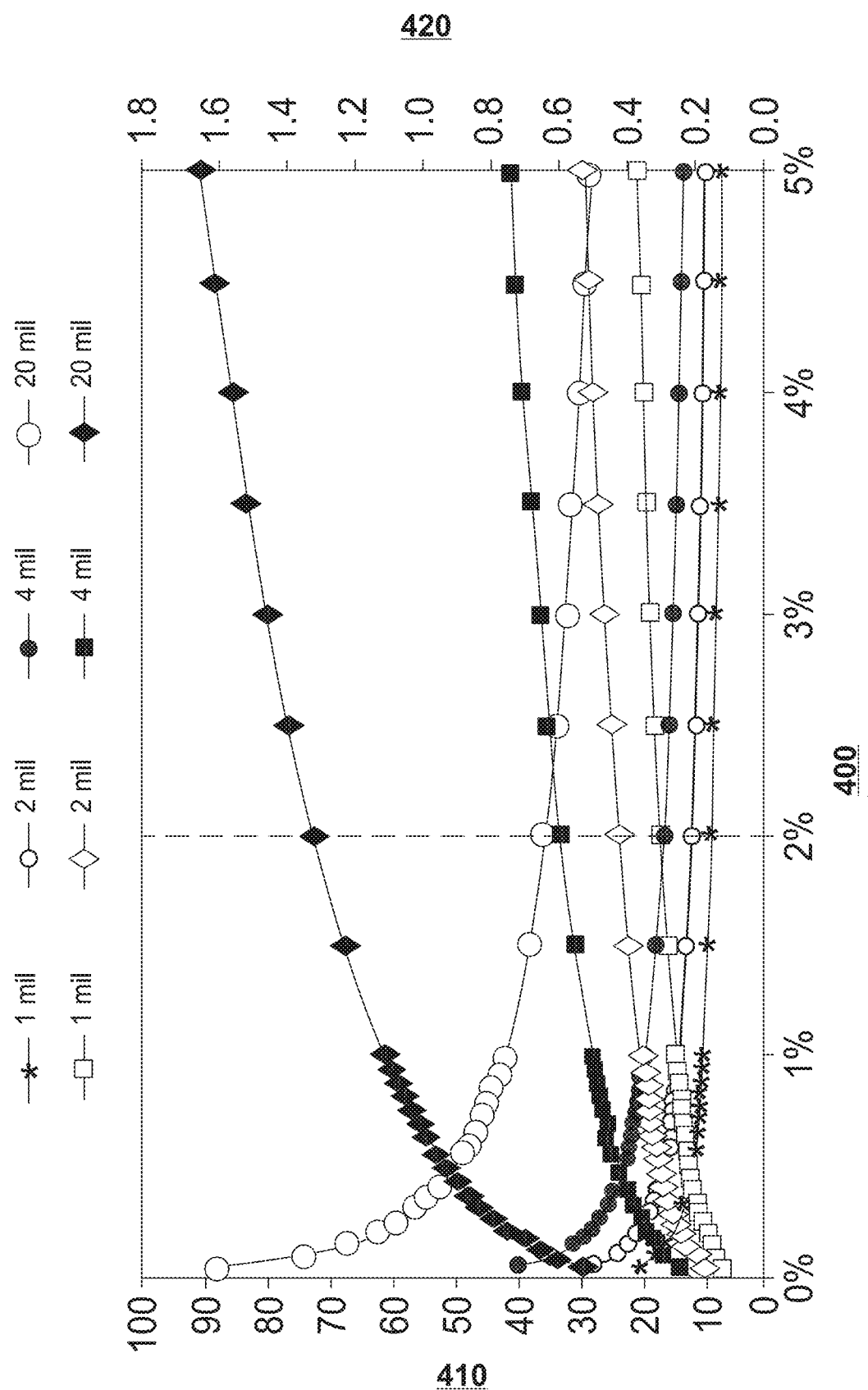
FIG. 8 is a graph of wrinkling wavelength and amplitude versus strain and thickness for copper alloy material at different thicknesses. X-axis (400) is biaxial strain %, first y-axis (410) is wavelength in mm and second y-axis (420) is amplitude in mm.

Thus, one example of adjusting subsection thickness to make the wrinkle wavelength longer than each piece's dimensions to avoid forming wrinkles is shown in FIG. 8, where strain (x-axis 400) versus wrinkle size (amplitude, shown at second y-axis 420) and spacing (wavelength, shown at first y-axis 410) for various thicknesses of copper alloy sheets (for 1 mil (0.0254 mm), 2 mil (0.508 mm), 4 mil (0.1016 mm), and 20 mil (0.508 mm) thicknesses). Thicker sheets have wider, but more widely spaced wrinkles. Thus, different thickness sheets may be chosen to avoid wrinkling. By choosing the size of subsections and the copper sheet thickness, wrinkling can be avoided.

With renewed reference to FIG. 7, the method includes designing overlapping seams and optionally alignment features in the pieces of the antimicrobial jacket assembly corresponding to the identified sub-sections at 330. At 340, a mold is created for stamping or hydroforming the metal pieces corresponding to the identified sub-sections from sheets of antimicrobial metal material. The pieces that will create the antimicrobial jacket assembly over the antimicrobial interior component are then formed at 350, for example, by hydroforming or stamping flat pieces or panels of the antimicrobial metal material. This may include forming features in each piece that correspond to the seams and alignment features. While not shown in FIG. 7, optionally the surface(s) of the respective pieces may be treated chemically, thermally, or electrochemically to passivate surfaces, as previously described above. At step 360, the pieces of the antimicrobial jacket assembly may be adhered or attached to the contoured surface of the antimicrobial interior component by applying an adhesive, heat, and/or through physical deformation. In certain variations, the antimicrobial metal pieces (e.g., copper alloys) may be attached to the underlying component with an adhesive and/or by deforming or crimping the pieces together. The pieces may be heated around the component, so the component partially melts and secures the pieces and thus antimicrobial jacket assembly to the component. In another variation, pressure may be used to deform the pieces into the component. Moreover, as described above, the component and pieces may have complementary mating features to align the pieces of the jacket assembly to the component, such as matching indentations and protrusions on the component and pieces, respectively. Finally, depending on the shape of the jacket assembly pieces and contoured surface, a hinge or locking mechanism could be built into the jacket assembly, which can simplify installation and bonding.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An antimicrobial interior component for a vehicle comprising:
    an interior component body having a contoured surface; and
    an antimicrobial jacket assembly comprising a first piece defining a first edge and a second piece defining a second edge, the first piece and the second piece being coupled together and disposed over the contoured surface, wherein the antimicrobial jacket assembly defines at least one touch surface disposed over the contoured surface of the interior component body, wherein the first piece and the second piece each comprises an antimicrobial metal material configured to prevent or minimize microbes from accumulating on the at least one touch surface, wherein the first piece and the second piece are coupled together at a zero-gap interface between the first edge and the second edge such that the first edge overlaps with the second edge at the zero-gap interface, and wherein the first edge and the second edge are tapered where the first edge and the second edge overlap such that a smooth interface is formed between the first edge and the second edge along the at least one touch surface where the first edge and the second edge overlap.

2. The antimicrobial interior component of claim 1, wherein the zero-gap interface is free of any sharp protrusions or protruding seams.

3. The antimicrobial interior component of claim 1, wherein the at least one touch surface of the antimicrobial jacket assembly is substantially free of any wrinkling.

4. The antimicrobial interior component of claim 1, wherein at least one gap is defined between the interior component body and the antimicrobial jacket assembly adjacent the zero-gap interface, and wherein the at least one gap is configured to permit differential thermal expansion between the interior component body and the antimicrobial jacket assembly.

5. The antimicrobial interior component of claim 1, wherein the first piece and the second piece are coupled together at the zero-gap interface by one or more of: an adhesive, mechanical deformation of at least a portion of the first piece to at least a portion of the second piece, or mechanical deformation of the first piece and the second piece into the contoured surface of the interior component body.

6. The antimicrobial interior component of claim 1, wherein the first edge of the first piece and the second edge of the second piece have complementary mating features that define an interlock therebetween.

7. The antimicrobial interior component of claim 1, wherein the antimicrobial metal material comprises, by weight, at least 60% copper.

8. The antimicrobial interior component of claim 1, wherein the antimicrobial interior component is selected from the group consisting of: a handle, a steering wheel, a shifter, a button, a switch, a lever, a latch, a cup holder, a center console, a glove compartment, and combinations thereof.

9. The antimicrobial interior component of claim 1, wherein the first piece and the second piece entirely surround a circumference of the interior component body.

10. The antimicrobial interior component of claim 1, wherein at least one of the first piece or the second piece comprises a first feature and the contoured surface of the interior component body comprises a second feature, where the first feature is complementary to the second feature and are configured to align and attach the first piece or the second piece to the interior component body.

11. An antimicrobial component for a vehicle comprising:
a component body having a contoured surface; and
an antimicrobial jacket assembly comprising a first metal piece defining a first edge and a second metal piece defining a second edge, the first metal piece and the second metal piece being coupled together and adhered to the contoured surface, wherein the antimicrobial jacket assembly defines at least one touch surface over the contoured surface of the component body, wherein the first metal piece and the second metal piece each has a thickness of less than or equal to about 0.51 mm and each comprises an antimicrobial copper-based material configured to prevent or minimize microbes from accumulating on the at least one touch surface and the at least one touch surface is substantially free of wrinkles,
wherein the antimicrobial copper-based material comprises, by weight, at least 60% copper, and
wherein the first piece and the second piece are coupled together at a zero-gap interface between the first edge and the second edge such that the first edge overlaps with the second edge at the zero-gap interface, and wherein the first edge and the second edge are tapered where the first edge and the second edge overlap such that a smooth interface is formed between the first edge and the second edge along the at least one touch surface where the first edge and the second edge overlap.

12. An antimicrobial interior component for a vehicle comprising:
an interior component body having a contoured surface; and
an antimicrobial jacket assembly comprising a first piece defining a first edge and a second piece defining a second edge, the first piece and the second piece being coupled together and disposed over the contoured surface, wherein the antimicrobial jacket assembly defines at least one touch surface disposed over the contoured surface of the interior component body, wherein the first piece and the second piece each comprises an antimicrobial metal material configured to prevent or minimize microbes from accumulating on the at least one touch surface, wherein the first piece and the second piece are coupled together at a zero-gap interface between the first edge and the second edge, wherein the first edge and the second edge abut each other without overlapping at the zero-gap interface, and wherein the first edge and the second edge each define a lip oriented orthogonal to the contoured surface that extends away from the at least one touch surface into the interior component body.

13. The antimicrobial interior component of claim 7, wherein the first piece and the second piece each have a thickness of less than or equal to about 0.51 mm.

\* \* \* \* \*